United States Patent [19] [11] Patent Number: 5,986,705
Shibuya et al. [45] Date of Patent: Nov. 16, 1999

[54] EXPOSURE CONTROL SYSTEM CONTROLLING A SOLID STATE IMAGE SENSING DEVICE

[75] Inventors: Fuminori Shibuya, Katano; Shigeo Sakaue, Toyonaka; Masaaki Nakayama, Hirakata, all of Japan

[73] Assignee: Matsushita Electric Industrial Co., Ltd., Osaka, Japan

[21] Appl. No.: 08/801,750

[22] Filed: Feb. 18, 1997

[51] Int. Cl.[6] .............................. G03B 7/00; H04N 5/235
[52] U.S. Cl. ............................. 348/362; 348/229
[58] Field of Search ................... 348/220, 221, 348/362, 363, 324, 364, 229, 230

[56] References Cited

U.S. PATENT DOCUMENTS

| 4,635,126 | 1/1987 | Kinoshita . | |
|---|---|---|---|
| 4,638,365 | 1/1987 | Kato | 345/362 |
| 4,899,212 | 2/1990 | Kaneko et al. | 348/220 |
| 4,959,727 | 9/1990 | Imaide et al. | 348/229 |
| 4,975,778 | 12/1990 | Park | 348/364 |
| 5,386,231 | 1/1995 | Shimizu et al. | 348/362 |
| 5,559,555 | 9/1996 | Shimizu et al. | 348/364 |
| 5,579,049 | 11/1996 | Shimaya | 348/229 |
| 5,638,123 | 6/1997 | Yamaguchi | 348/362 |

FOREIGN PATENT DOCUMENTS

| 0 416 781 | 3/1991 | European Pat. Off. . |
| 0 476 907 | 3/1992 | European Pat. Off. . |
| 0 647 063 | 4/1995 | European Pat. Off. . |
| 1-159470 | 11/1989 | Japan . |
| 2 284 318 | 5/1995 | United Kingdom . |

OTHER PUBLICATIONS

Search Report dated Apr. 28, 1997.

*Primary Examiner*—Wendy Garber
*Assistant Examiner*—Alicia M. Harrington
*Attorney, Agent, or Firm*—Ratner & Prestia

[57] ABSTRACT

An exposure adjustment apparatus determines, based on the level of a signal of an object converted by a solid state image sensing device, whether the exposure time or the gain is to be decreased, increased or maintained, and controls the gain of an amplifier and the drive pulse to be generated by a drive pulse generator. Thereby, the output signal level is adjusted by controlling only the exposure time of the solid state image sensing device and the gain of the video signal resulting in a compact and vibration-resistant exposure control system which is inexpensive.

4 Claims, 13 Drawing Sheets

EXPOSURE CONTROL SYSTEM CONTROLLING A SOLID STATE IMAGE SENSING DEVICE

BACKGROUND OF THE INVENTION

The present invention relates to an exposure control system which controls the video signal of an object image by controlling the exposure time of a solid state image sensing device and the gain to be given to the output of the solid state image sensing device.

A conventional exposure control system controls the exposure time and the gain by providing an output from a solid state image sensing device with a gain, and, based on the value of this output, driving an iris diaphragm, a liquid crystal filter or such other means.

An example of a conventional exposure control system is described in Japanese Laid Open Utility Model No. Hei 1-159470.

A conventional exposure control system as disclosed by the above is described as follows:

FIG. 14 is a block diagram of a prior art exposure control system. In FIG. 14, numeral 1401 denotes a lens for receiving and focusing an object image, 1402 is a transparency variable liquid crystal filter, 1403 is a solid state image sensing device, 1404 is a control circuit for controlling the transparency variable liquid crystal filter, 1405 is a video amplifier, 1406 is an electronic shutter control circuit, and 1407 is a video amplifier with AGC.

The operation of an exposure control system constituted as above is described as follows:

An object image formed by lens 1401 through transparency variable liquid crystal filter 1402 is converted into an electric signal by solid state image sensing device 1403, which signal is taken out as a video signal via video amplifier 1405. Based on the level of the video signal, control circuit for controlling transparency variable liquid crystal filter 1404 adjusts the transparency of the transparency variable liquid crystal filter, electronic shutter control circuit 1406 adjusts the exposure time of solid state image sensing device 1403, and video amplifier with AGC 1407 adjusts the value of the gain resulting in the control of the exposure time and gain of the camera.

When the object brightness increases, the level of the video output signal of solid state image sensing device 1403 rises, and as a result, the level of the video output signal of video amplifier 1405 increases. In response, the light transmission of transparency variable liquid crystal filter 1402 is controlled to reduce the light transmission. When the object brightness increases further to exceed the control range of transparency variable liquid crystal filter, electronic shutter control circuit 1406 is put into operation to decrease the time for accumulating an electric charge in solid state image sensing device 1403, in order to lower the level of the video output signal.

In the above described conventional constitution, however, the transparency variable liquid crystal filter 1402 requires a certain size, making it difficult to make the whole system smaller. Moreover, because the electronic shutter works within a certain time after the final pulse of the discharge pulse is input within a horizontal blanking period for discharging the electric charge accumulated in the light sensing elements(photo diode) of the solid state image sensing device until a transfer pulse for transferring the electric charge accumulated in the light sensing elements to transfer channel as the exposure time of solid state image sensing device, the exposure time is a discrete value depending on each respective horizontal scanning period.

The discharging pulse is not input during the picture scanning period because during that period the signal is taken out through the transfer channel; if a discharge pulse is applied to the light sensing elements on the same substrate the signal is affected by the pulse and noise is caused on the picture. Therefore, the discharging pulse is limited to the horizontal blanking period to avoid the noise. As the exposure time of the solid state image sensing device decreases, the ratio of the discharging pulse period versus exposure time becomes larger. As a result the quantity of exposure shifts greatly with the input of a discharging pulse. Therefore, the output of the solid state image sensing device shows a step change when the exposure time is varied Consequently, the brightness of a picture flickers and presents a very unpleasant scene.

SUMMARY OF THE INVENTION

The present invention is intended to solve the above prior art problems, and presents an exposure control system in which i) the level of output signal is smoothly adjusted by controlling only the exposure time of the solid state image sensing device and the gain of the video signal, or ii) controlling only the exposure time of the solid state image sensing device.

In order to implement the above objective, an exemplary embodiment of the present invention comprises;

a lens for receiving an image of an object, a solid state image sensing device for performing a photoelectric conversion of the image of the object received through the lens, amplifying means for providing an output value of said solid state image sensing device with a gain, exposure adjustment means for adjusting the exposure time of said solid state image sensing device and the gain of said amplifying means, based on one of the output of said solid state image sensing device and the output of said amplifying means, and drive pulse generating means for generating a drive pulse which determines an exposure time of said solid state image sensing device;

wherein said exposure adjustment means controls a rate of change of said output of said amplifying means below a predetermined value by adjusting the gain at said amplifying means and the exposure time of said solid state image sensing device, responsive to a change in the brightness of said object.

In another exemplary embodiment of the present invention the values of gain of the amplifying means are discrete values.

In another exemplary embodiment of the present invention the exposure time which is adjusted by the exposure adjustment means is controlled to take discrete values.

In another exemplary embodiment of the present invention the exposure adjustment means comprises:

exposure judgment means for determining to one of increase, decrease and maintain one of the exposure time and the gain, exposure time control means for controlling the exposure time of said solid state image sensing device, gain control means for controlling the gain of said amplifying means, and exposure time memory device for memorizing a shortest exposure time of said solid state image sensing device;

wherein said exposure judgment means determines whether the exposure time of said solid state image sensing device is to be one of lengthened, shortened, and maintained, and supplies the result to said exposure time control means, said exposure time control means determines an exposure time based on the result of the determination by said exposure judgment means, said exposure time memory device supplies the shortest of the exposure time corresponding to the value of the gain output from said gain control means to the exposure time control means, when the exposure time coincides with the shortest time and the exposure judgment means shortens the exposure time, the exposure time control means lengthens the exposure time, and the gain control means lowers the gain by a predetermined value, and when the exposure time coincides with a predetermined time and the exposure judgment means determines to make the exposure time long, the exposure time control means shortens the exposure time to a predetermined value, and the gain control means increases the gain by a predetermined value.

In a further exemplary embodiment of the present invention the exposure adjustment means comprises:

exposure judgment means for judging to one of increase, decrease and maintain one of the exposure time and the gain, exposure time control means for controlling the exposure time of said solid state image sensing device, gain control means for controlling the gain of said amplifing means, and a gain memory device for memorizing the smallest value of the gain of said amplifying means;

wherein said exposure judgment means determines whether the gain of said amplifying means is to be one of increased, decreased and maintained, and supplies the result to said gain control means, said gain control means determines a gain based on the result of judgment by said exposure judgment means, said gain memory device supplies the smallest value of the gain to the gain control means, based on the value of exposure time output from said exposure time control means, when the gain coincides with the smallest gain and the exposure judgment means determines to make the gain small, the gain control means makes the gain the largest, and the exposure time control means makes the exposure time a step shorter, and in a case when the gain coincides with the largest value and the exposure judgment means judges to make the gain large, the gain control means makes the gain the smallest, and the exposure time control means increases the exposure time by a predetermined value.

Another exemplary embodiment of the present invention comprises, a lens for receiving the image of an object, a solid state image sensing device for performing a photoelectric conversion on the image of the object received by the lens, exposure judgment means for judging whether the exposure time is to be one of increased, decreased and maintained, based on the output of said solid state image sensing device, exposure time control means for controlling the exposure time of said solid state image sensing device, and drive pulse generating means for generating a pulse to drive said solid state image sensing device; wherein said exposure time control means controls said drive pulse generating means based on a judgment by said exposure judgment means, when the discharging pulse which is supplied from said drive pulse generating means to said solid state image sensing device is within the vertical blanking period, the change rate of the output from said solid state image sensing device is controlled to be below a certain specific value whenever said object brightness may change, by controlling the exposure time so as to take continuous values.

In an exposure control system of the exemplary embodiments, the exposure adjustment means determines whether the exposure time, or the gain, is to be decreased, increased or maintained, based on the level of an electric signal of an object image converted by a solid state image sensing device. The exposure adjustment means controls the gain of the amplifing means and the driving pulse to be generated by a drive pulse generating means.

In an exposure control system of another exemplary embodiment, the exposure adjustment means determines whether the exposure time is to be decreased, increased or maintained, based on the level of an electric signal of an object image converted by a solid state image sensing device, and controls the driving pulse to be generated by the drive pulse generating means.

As described above, the present invention presents a compact, vibration-resistant and inexpensive exposure control system, in which the level of output signal is controlled so as the rate of change of the output from the amplifying means, or the solid state image sensing device, is suppressed to be below a certain specific value whenever the brightness of an object changes, by i) controlling only the exposure time of the solid state image sensing device and the gain of the video signal, or by ii) controlling only the exposure time of the solid state image sensing device, providing a picture which is free of flickers.

EMBODIMENTS OF THE INVENTION

In the following, an exemplary embodiment of the present invention is described referring to the figures.

Figure 1A:
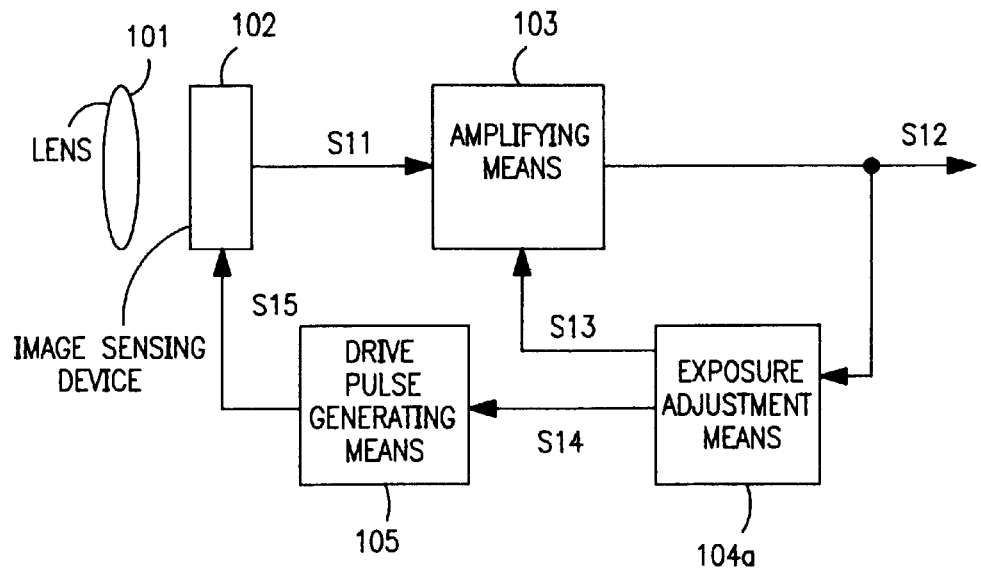
FIG. 1A is a block diagram of an exposure control system according to a first exemplary embodiment of the present invention.

FIG. 1A is a block diagram of an exposure control system according to a first exemplary embodiment of the present invention. In FIG. 1A, numeral 101 denotes a lens for focusing an object image, 102 is a solid state image sensing device for performing a photoelectric conversion on an image of an object focused through lens 101, 103 is an amplifying means for providing an output value of the solid state image sensing device 102 with a gain, 104a is an exposure adjustment means for adjusting the exposure time of the solid state image sensing device 102 and the gain of amplifying means 103 based on the output of amplifying means 103, 105 is a drive pulse generating means for generating a drive pulse to control solid state image sensing device 102.

The operation of an exposure control system according to the present exemplary embodiment is described in the following. An image of an object focused through lens 101 is converted into electric signal S11 by solid state image sensing device 102, amplifying means 103 provides electric signal S11 with a gain which is output as video signal S12. Exposure adjustment means 104a determines, based on the signal level of video signal S12, whether the existing exposure time and the gain are to be decreased, increased or maintained. If they are to be decreased, exposure time control signal S14 is supplied to drive pulse generating means 105, and drive pulse S15 is generated by drive pulse generating means to shorten the exposure time of solid state image sensing device 102. When the exposure time becomes short, gain control signal S13 is output to amplifyig means 103 so that the gain value of amplifying means 103 is less than 1. In this way the exposure time and the gain are adjusted. When the exposure time and the gain are to be increased, drive pulse generating means 105 is controlled to make the exposure time of solid state image sensing device 102 longer. When the exposure time is a maximum, the gain value of amplifying means 103 is made to be greater than 1. When the exposure time and the gain are to be maintained, drive pulse generating means 105 and amplifying means 103 are controlled to maintain the drive pulse and the gain.

Figure 13:
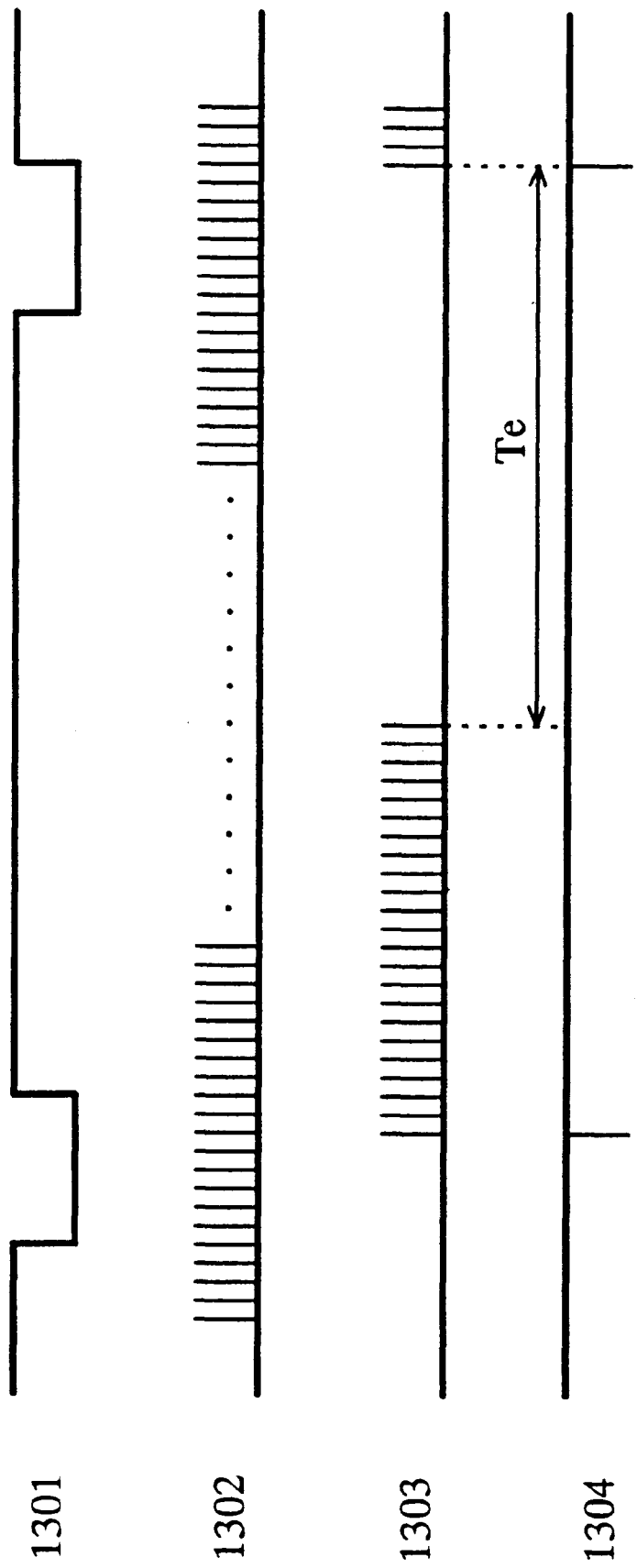
FIG. 13 is a timing chart explaining the exposure time.
Figure 14:
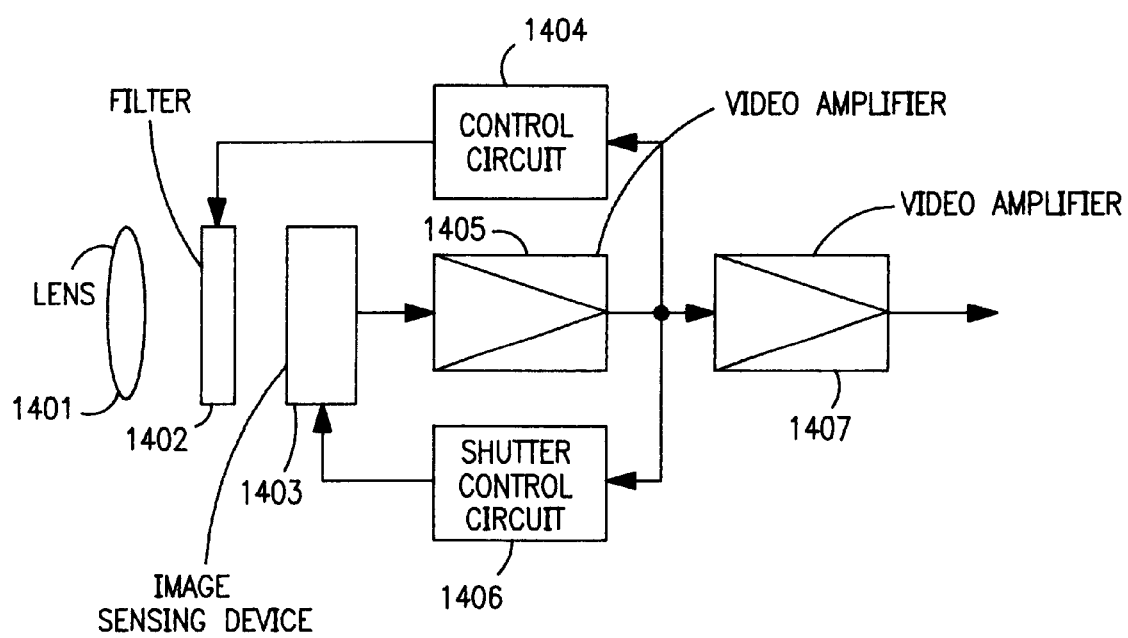
FIG. 14 is a block diagram of a prior art exposure control system.

In order to decrease the exposure time Te, a discharging pulse 1303 for discarding the electric charge accumulated in the light sensing elements(photo diode) of the solid state image sensing device is input, as shown in FIG. 13, during the horizontal blanking period. 1303 and 1302 denote vertical and horizontal blanking respectively. The reason why it is executed during the horizontal blanking period is, as described earlier, to prevent the signal which is read out through the transfer channel from being affected by noise. The period between the last pulse of the discharging pulse until the transfer pulse 1304, for transferring the electric charge accumulated in the light sensing elements during the vertical blanking period to the transfer channel, is the exposure time Te of the solid state image sensing device. The longest exposure time Te is obtained when there is no discharging pulse input, thereby the period from a transfer pulse until a succeeding transfer pulse is the exposure time.

Figure 1B:
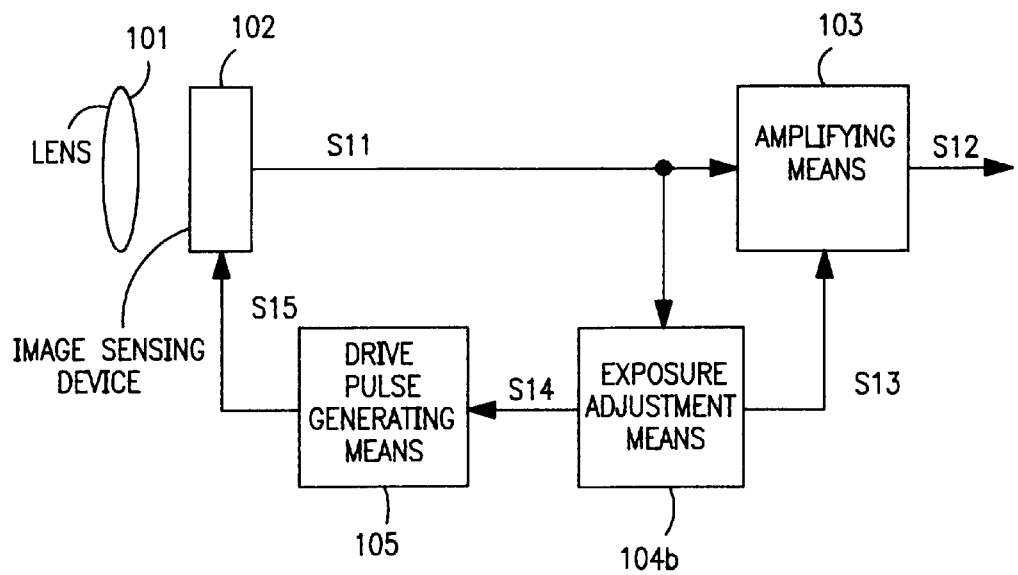
FIG. 1B is a block diagram of an exposure control system according to a second exemplary embodiment of the present invention.

Now in the following, a second exemplary embodiment of the present invention is described referring to the figures. FIG. 1B is a block diagram of an exposure control system according to a second exemplary embodiment of the present invention. In FIG. 1B, numeral 101 denotes a lens for focusing an object image, 102 is a solid state image sensing device for performing photoelectric conversion on an image of an object focused through lens 101, 103 is an amplifying means for providing the output value of solid state image sensing device 102 with a gain, 104b is an exposure adjustment means for adjusting the exposure time of solid state image sensing device 102 and the gain of amplifying means 103 based on the output of solid state image sensing device 102, 105 a drive pulse generating means for generating a drive pulse to control solid state image sensing device 102.

The operation of an exposure control system constituted according to the present exemplary embodiment is described in the following. What is different from the first embodiment shown in FIG. 1A is: The output signal S11 from the solid state image sensing device is delivered to exposure adjusting means 104b for determining, based on the signal level of S11, whether the existing exposure time and gain are to be decreased, increased or maintained. If they are to be decreased, exposure time control signal S14 is supplied to drive pulse generating means 105 to shorten the exposure time of solid state image sensing device 102. When the exposure time is short, a gain control signal S13 is output to amplifying means 103 to have the gain value of amplifying means 103 become less than 1. In this way the exposure time and is the gain are adjusted. The functions of the remaining blocks are the same as in FIG. 1A.

Figure 2:
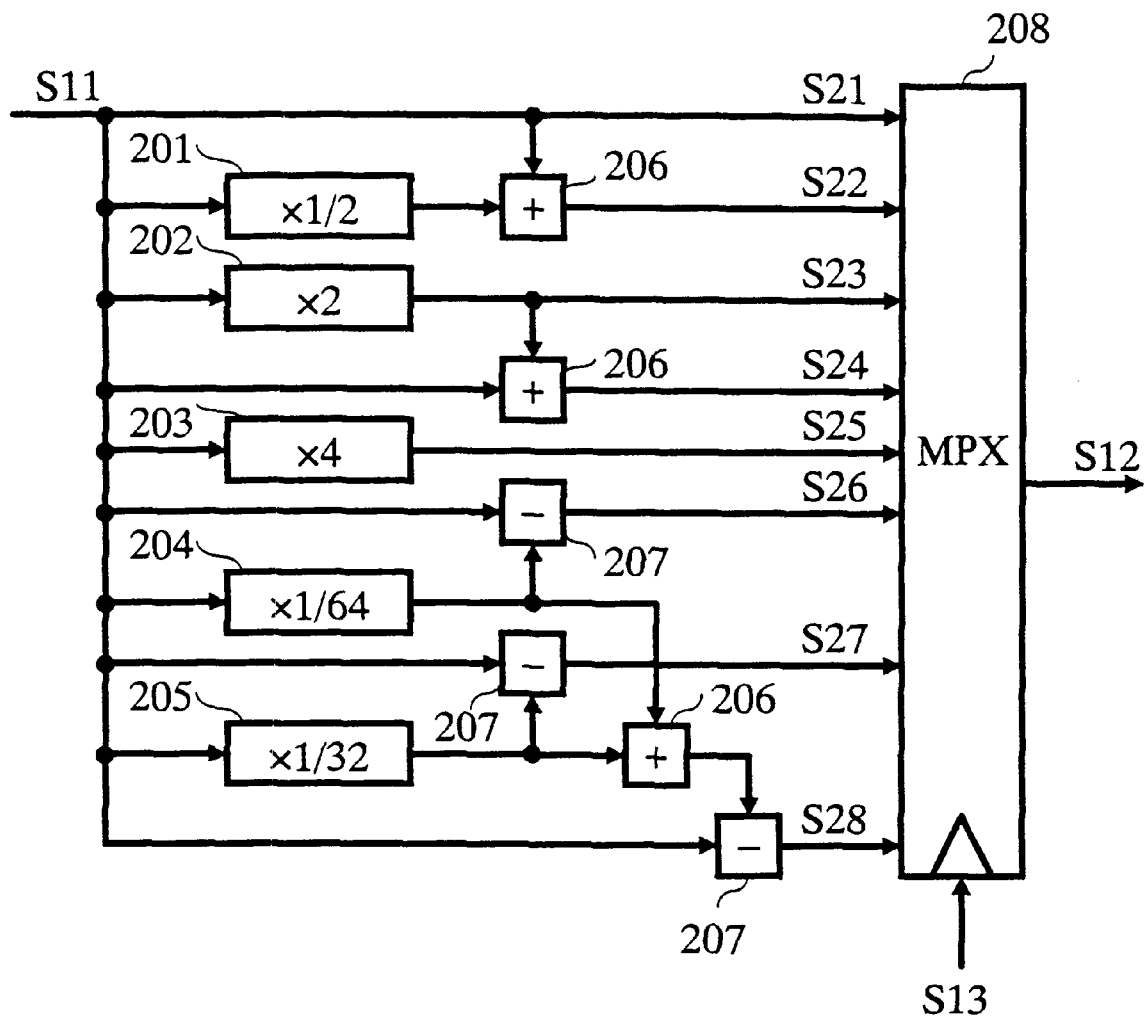
FIG. 2 is a block diagram of amplifying means 103 in the first and second exemplary embodiments of the present invention.

FIG. 2 shows the details of amplifying means 103 in the first and the second exemplary embodiments. In FIG.2, numerals 201, 202, 203, 204 and 205 denote bit shifters for multiplying the output signal S11 from solid state image sensing device 102 by ½, 2, 4, 1/64 and 1/32 times, respectively; 206 is an adder; 207 is a subtracter; and 208 is a multiplexer for selecting either one of signals S21, S22, S23, S24, S25, S26, S27 and S28 in accordance with the gain control signal S13 supplied from exposure adjustment means 104a or 104b.

The operation of amplifying means 103 constructed as above is described in the following. Each of the bit shifters shifts output signal S11 of solid state image sensing device 102; 201 shifts S11 towards the LSB by 1 bit to result in ½ times, 202 shifts S11 towards the MSB by 1 bit to result in 2 times, 203 shifts S11 towards the MSB by 2 bits to result in 4 times, 204 shifts S11 towards the LSB by 6 bits to result in 1/64 times, 205 shifts S11 towards the LSB by 5 bits to result in 1/32 times; each one of the bit shifter outputs is added or subtracted to the signal S11 by adder 206 or subtracter 207 to produce signals S21(S11×1), S22(S11×1.5), S23 (S11×2), S24(S11×3), S25(S11×4), S26(S11×(1/64)), S27 (S11×(11/32)), and S28(S11×(13/64)). One of these signals is selected by the multiplexer 208 to be delivered as the video signal S12 having a gain. Multiplexer 208 selects the signal under the control of gain control signal S13 delivered from exposure adjustment means 104a or 104b.

Figure 3:
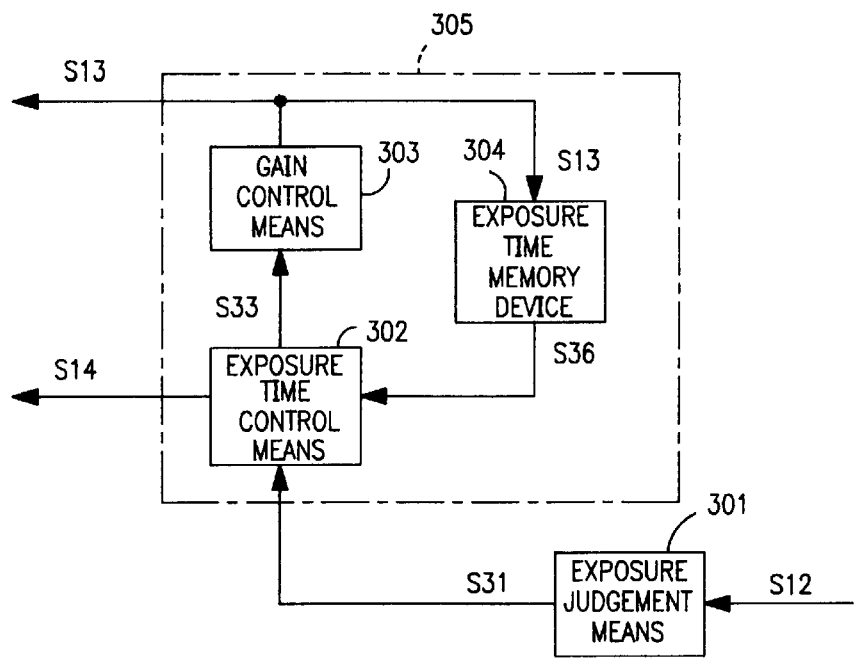
FIG. 3 is a block diagram showing a first constitution of the exposure adjustment means 104a of the first exemplary embodiment of the present invention.

FIG. 3 shows the constitution of exposure adjustment means 104a in further detail. In FIG. 3, 301 is an exposure judgment means which determines, referring to video signal S12, whether the exposure time and the gain are to be decreased, increased or maintained, and outputs control signal S31. Numeral 302 denotes an exposure time control means for controlling the exposure time of the solid state image sensing device 102, 303 is a gain control means for controlling the gain of amplifying means 103, and 304 is an exposure time memory device for memorizing the shortest exposure time of solid state image sensing device 102. The block surrounded by broken lines, in which 302, 303 and 304 are contained, is treated as exposure control means 305.

The operation of each respective part is described below. Exposure judgment means 301 compares the signal level of video signal S12 having a gain provided by the amplifying means with the reference value; and determines whether the exposure time and the gain are to be decreased, increased or maintained, for bringing the video signal S12 to approach to the reference value; and the result of the judgment is output as S31. Exposure time control means 302 makes the exposure time control signal S14 longer if the judgment result S31 provided by exposure judgment means 301 lengthens the exposure time, shortens the exposure time control signal S14 if the judgment result S31 shortens the exposure time, and maintains the exposure time control signal S14 if the judgment result S31 maintains the exposure time. When the exposure time control signal S14 coincides with the shortest exposure time S36 delivered from exposure time memory device 304, and the judgment result S31 is to shorten the exposure time, the exposure time control signal S14 is set at the longest time and the gain control means 303 lowers the gain control signal S13 by one step. When the change value of each of the exposure control signal S14 and the gain control signal S13 have to be controlled so that the video signal S12 approachs the reference value as a result of making the exposure control signal S14 the longest and lowering the gain by one step; namely the control has to be conducted so that the video signal S12 does not vary as a result of such operation. In a case where the exposure time control signal S14 coincides with the longest exposure time and the judgment result S31 is to lengthen the exposure time, the exposure time control signal S14 is set at the shortest time S36 as supplied from exposure time memory device 304 and the gain control means 303 raises the gain control signal S13 by one step. The shortest time S36 supplied from exposure time memory device 304 is dependent on the value of gain control signal S13 delivered from gain control means 303. In the exposure adjustment means 104b of the second exemplary embodiment, the output signal S11 of solid state image sensing device 102 is supplied in place of video signal S12, and the same operation as in the exposure adjustment means 104a is performed.

Figure 4:
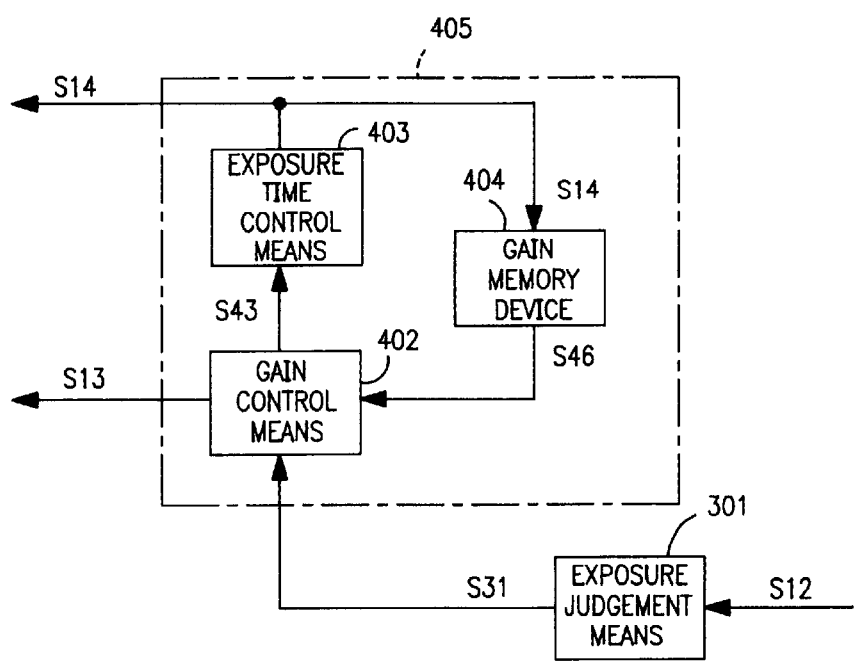
FIG. 4 is a block diagram showing a second constitution of exposure adjustment means 104a of the first exemplary embodiment of the present invention.

FIG. 4 shows a detailed constitution of a second example of exposure adjustment means 104a. In FIG. 4, 301 is an exposure judgment means which judges, referring to the exposure status at the time(video signal S12), whether the exposure time and the gain are to be decreased, increased or maintained, and outputs control signal S31. Numeral 402 denotes a gain control means for controlling the gain of amplifying means 103, 403 is an exposure time control means for controlling the exposure timer of solid state image sensing device 102, and 404 is a gain memory device for memorizing the smallest gain value of amplifying means 103. The block surrounded by broken lines, in which 402, 403 and 404 are contained, is treated as exposure control means 405. The operation of each respective part is described below. Exposure judgment means 301 operates in the same way as described in FIG. 3. Gain control means 402 makes the value of gain control signal S13 larger if the judgment result S31 given by exposure judgment means 301 is to increase the gain, decreases the gain control signal S13 if the judgment result S31 indicates to make the gain smaller, and holds the value of gain control signal S13 if the judgment result S31 indicates to maintain the gain. When the gain control signal S13 coincides with the smallest gain value S46 delivered from gain memory device 404 and the judgment result S31 indicates to decrease the gain, the gain control signal S13 is set to the largest value and the exposure time control means 403 lowers the exposure time control signal S14 by one step. When the gain control signal S13 coincides with the largest gain and the judgment result S31 indicates to increase the gain, the gain control signal S13 is set to the smallest value S46 as supplied from gain memory device 404 and the exposure time control means 403 raises the exposure time control signal S14 by one step. The smallest value of gain S46 as supplied from gain memory device 404 is dependent on the value of exposure time control signal S14 delivered from exposure time control means 403. When the circuit of FIG. 4 is used as the exposure adjustment means 104b of second exemplary embodiment, the output signal S11 of solid state image sensing device is supplied as the input signal in place of video signal S12, and the same operation as in the exposure adjustment means 104a is performed.

Figure 5:
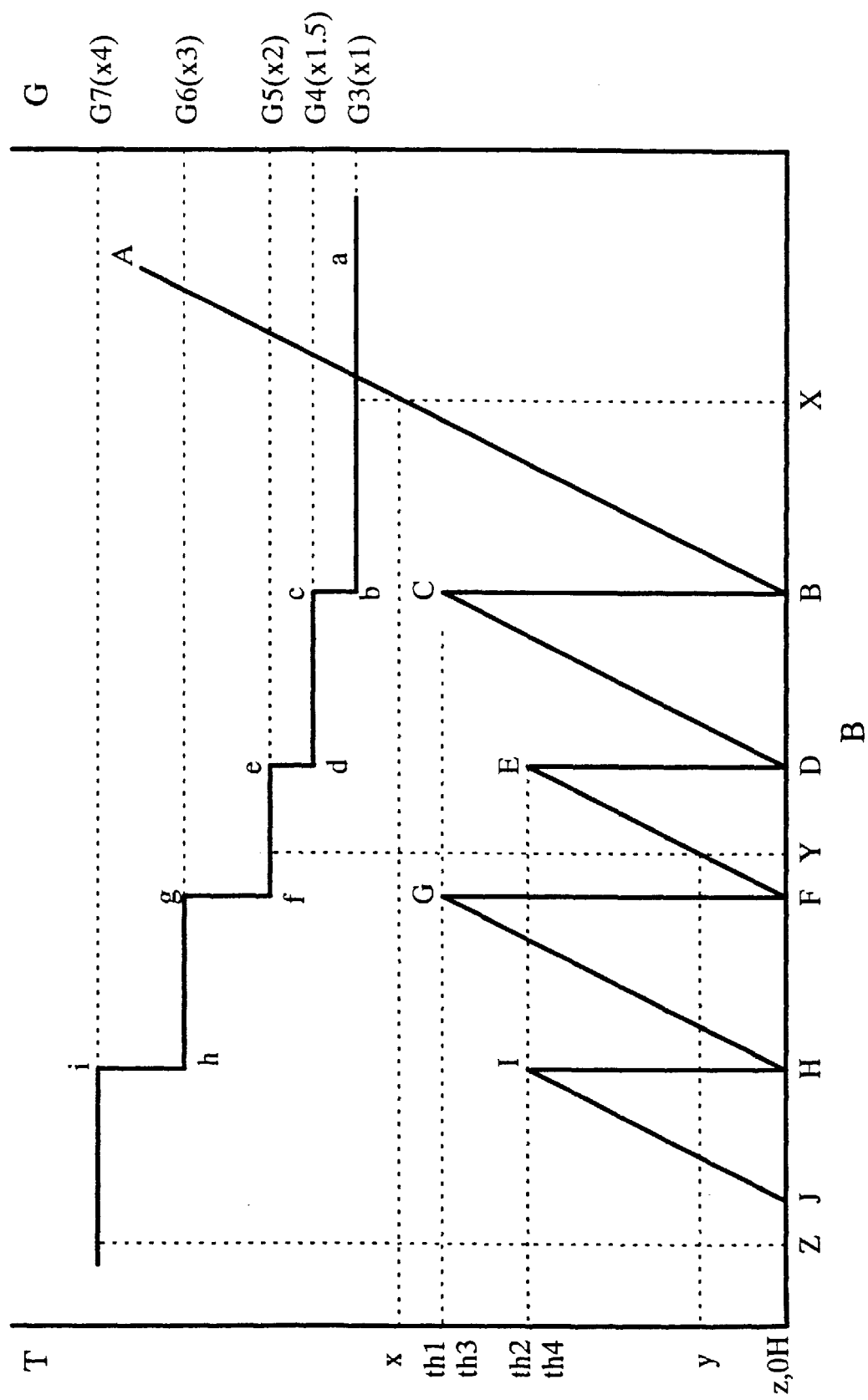
FIG. 5 is an operating characteristics chart showing the control signals of the amplifying means and the drive pulse generating means at low brightness, in the first and second exemplary embodiments of the present invention.
Figure 6:
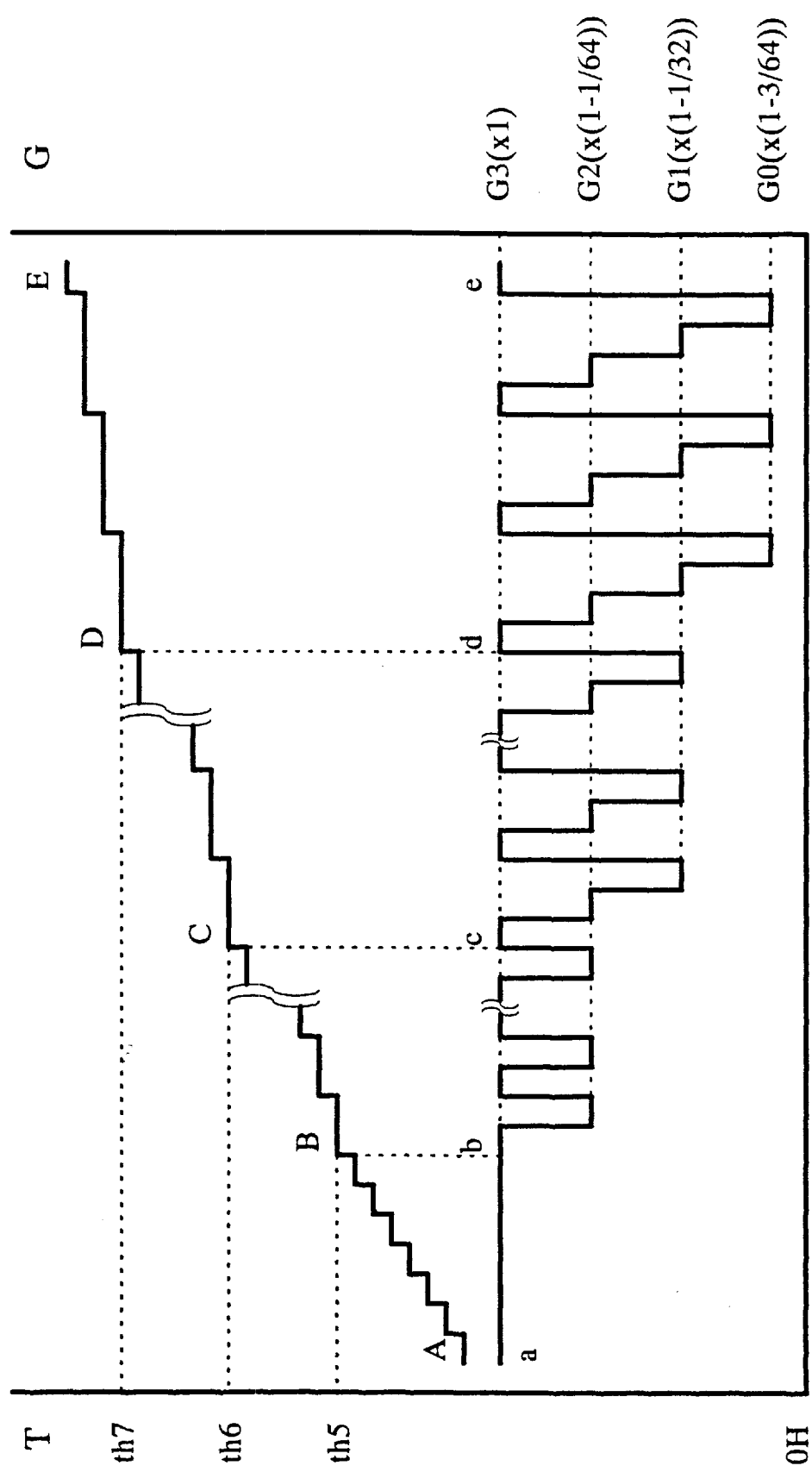
FIG. 6 is an operating characteristics chart showing the control signals of the amplifying means and the drive pulse generating means at high brightness, in the first and second exemplary embodiments of the present invention.

The operating characteristics of gain control signal S13 and exposure time control signal S14 are described referring to FIG. 5 and FIG. 6. In FIG. 5 and FIG. 6, the horizontal axis represents the brightness B of an object. The brightness B increases towards the right, and decreases towards the left. The left vertical axis corresponds to the exposure time control signal S14, which determines the exposure time T of the solid state image sensing device 102 by having drive pulse generating means 105 generate a discharging pulse and, therefore, it is relevant to the speed of electronic shutter.

The right vertical axis corresponds to the gain control signal S13, which determines the gain G to be given by the amplifying means 103 to the output(S11) of solid state image sensing device 102 and, therefore, it is equivalent to the gain G of amplifying means 103. The drive pulse generating means 105 supplies a discharging pulse to solid state image sensing device 102 during the horizontal blanking period, and the exposure time is determined by a time period from the last discharging pulse until the transfer pulse. Thus, the left vertical axis in FIG. 5 and FIG. 6 represents one field cycle minus the exposure time (electric charge discharging period).

FIG. 5 is an operating characteristics chart with respect to an object at low brightness. In the chart, the locus a, b, c, d, e, f, g, h, i indicates the gain control signal S13, and the locus A, B, C, D, E, F, G, H, I, J indicates the exposure time control signal S14. An operating characteristic is described in the following using an example when the brightness of an object shifts from the existing point X to point Y in the chart. According to FIG. 5, the electric charge discharging period at object brightness X is x, and the gain is G3 (1 time). When the object brightness shifts from this status to Y, the electric charge discharging period of the solid state image sensing device changes in the sequence B C D E on the locus, while the gain changes in the sequence b c d e on the locus. Namely, the electric charge discharging period starts to decrease from x, while the gain remains at G3. Upon reaching the smallest value(B) the electric charge discharging period is shifted to th1(C) and at the same time the gain is raised by one step (b–c) to G4(1.5 times). Then, the electric charge discharging period decreases, while the gain remains at 1.5 times. Upon reaching the smallest value(D) the electric charge discharging period is shifted to th2(E) and at the same time the gain is raised by one step (d–e) to G5(2 times). The electric charge discharging period is further decreased; when reaching y(electric charge discharging period y, gain G5), it represents the controlled state at object brightness Y.

As another operational example, a case when the object brightness shifted from point Z to point Y is described in the following. According to FIG. 5 the electric charge discharging period at object brightness Z is z, and the gain is G7(4 times). When the object brightness shifts from this status to Y, the electric charge discharging period of the solid state image sensing device changes in the sequence J I H G F on the locus, while the gain changes in the sequence i h g f on the locus. Namely, the electric charge discharging period starts to increase from z, while the gain remains at G7. Upon reaching th4(f) the electric charge discharging period is shifted to the smallest value(H) and at the same time the gain is lowered by one step (i–h) to G6(3 times). Then, the electric charge discharging period increases, while the gain remains at G6. Upon reaching th3(G) the electric charge discharging period is shifted to the smallest value(F) and at the same time the gain is lowered by one step (g–f) to G5(2 times). The electric charge discharging period is again increased; when reaching y(electric charge discharging period y, gain G5), it represents the controlled state at object brightness Y. As described above, in the case where the object brightness is decreasing, the electric charge discharging period decreases, upon reaching the smallest value the electric charge discharging period is shifted to th1, th2, th3 or th4 (th1 if the gain is G3, th2 if the gain is G4, th3 if the gain is G5, th4 if the gain is G6), and the gain is raised one step higher. In the case where the object brightness is increasing, the electric charge discharging period increases, upon reaching th1, th2, th3 or th4 (th1 if the gain is G4, th2 if the gain is G5, th3 if the gain is G6, th4 if the gain is G7) the electric charge discharging period is shifted to the lowest value and the gain is lowered by one step. The values th1, th2, th3 and th4 are obtainable through the following formulae:

> th1=longest exposure time−) (longest exposure time×gain G3(1 time)/gain G4(1.5 times))
>
> th2=longest exposure time−) (longest exposure time×gain G4(1.5 times)/gain G5(2 times))
>
> th3=longest exposure time−) (longest exposure time×gain G5(2 times)/gain G6(3 times))
>
> th4=longest exposure time−) (longest exposure time×gain G6(3 times)/gain G7(4 times))

where, the longest exposure time is a time span from a transfer pulse for transferring an electric charge accumulated in the light sensing elements to the CCD until the next transfer pulse.

The operating characteristics of the gain control signal S13 and the exposure time control signal S14 at low brightness, namely the relationship between the gain and the electric charge discharging period, are as described in the foregoing descriptions.

FIG. 6 is an operating characteristics chart, showing the object image at high brightness. In the chart, the locus a, b, c, d, e indicate the gain control signal S13, and the locus A, B, C, D, E indicate the exposure time control signal S14. The sequence of operation is described in the following.

Up to the electric charge discharging period th5, when the object brightness B increases to cause an increasing output signal S11 of solid state image sensing device 102, the output video signal S12 of amplifying means 103 is controlled by shifting the electric charge discharging period step by step for one horizontal scanning period (A–B), while holding the gain (a–b) at G3(1 time). In the range, th5 electric charge discharging period<th6, when the object brightness B increases to cause an increasing output signal S11 of solid state image sensing device 102, the gain G is shifted from G3 to G2 (1 1/64 times), while the electric charge discharging period is held fixed, and then the electric charge discharging period is increased by one horizontal scanning period at the same time the gain is restored to G3. The output video signal S12 of amplifying means 103 is controlled by repeating the above operation. When the object brightness decreases causing a decreased output signal S11 of solid state image sensing device 102, the electric charge discharging period is decreased by one horizontal scanning period at the same time the gain is shifted from G3 to G2, and then restored to G3 while the electric charge discharging period is held fixed. The output video signal S12 of amplifying means 103 is controlled by repeating the above operation.

In the range, th6 electric charge discharging period<th7, when the output signal S11 of solid state image sensing device 102 increases, the gain is shifted from G3 to G2 while the electric charge discharging period is held fixed, and then from G2 to G1 (1 1/32 times), and then the gain is restored to G3 at the same time the electric charge discharging period is increased by one horizontal scanning period.

In the range, th6 electric charge discharging period<th7, when the output signal S11 of solid state image sensing device 102 decreases, the electric charge discharging period is decreased by one horizontal scanning period at the same time the gain is shifted from G3 to G1, and then from G1 to G2, and restored to G3. The above operation is repeated.

In the range where th7 electric charge discharging period, when the object brightness increases to cause an increasing output signal S11 of solid state image sensing device 102, the gain is shifted from G3 to G2 holding the electric charge discharging period fixed, and then from G2 to G1, and then from G1 to G0(1 3/64 times), and then restored to G3 at the same time the electric charge discharging period is increased by one horizontal scanning period. The above operation is repeated. In the range where th7 electric charge discharging period, when the output signal S11 of solid state image sensing device 102 decreases, the electric charge discharging period is decreased by one horizontal scanning period at the same time the gain is shifted from G3 to G0, and then from G0 to G1, and then from G1 to G2, and then restored to G3. The above operation is repeated. Described above is the operating characteristics of gain control signal S13 and exposure time control signal S14, namely the relationship between the gain and the electric charge discharging period, at high brightness.

In a high brightness region where the electric charge discharging period is more than th5, especially more than th7, the exposure time becomes extremely short, because of which, if the change in video signal output S12 caused by the brightness change is to be encountered by a change of exposure time, the change of electric charge discharging period for each one horizontal period, viz. the change of exposure time, results in a stepping change of picture brightness, creating an unnatural change in a picture.

To cope with such drawbacks, the gain is varied, in a region from th5 to th6 of the electric charge discharging period, for two steps, G3 and G2, during the one step change for the electric charge discharging period, as described above. In a region from th6 to th7, the gain is varied for three steps, G3, G2 and G1, during the one step change for the electric charge discharging period. In a region above th7, the gain is varied by four steps, G3, G2, G1 and G0, during the one step change for the electric charge discharging period.

In the conventional method, the brightness of a picture changed by flickering brighter and darker when a control is executed against the change in object brightness.

According to the present invention, the change rate of video signal S12 of amplifying means 103 is suppressed below a certain specific value, below 2% with the values exemplified in the present exemplary embodiment, for example,whatever the state of brightness may be. As a result, the above described unnatural change of brightness is hardly recognizable in a picture.

Shift values in the gain of amplifier 103 as cited in the above are just exemplary values, the values may be determined in accordance with a policy as to below what shift rate the change of video signal output S12 from amplifier 103 be suppressed against the change of exposure time in one horizontal period.

Figure 7:
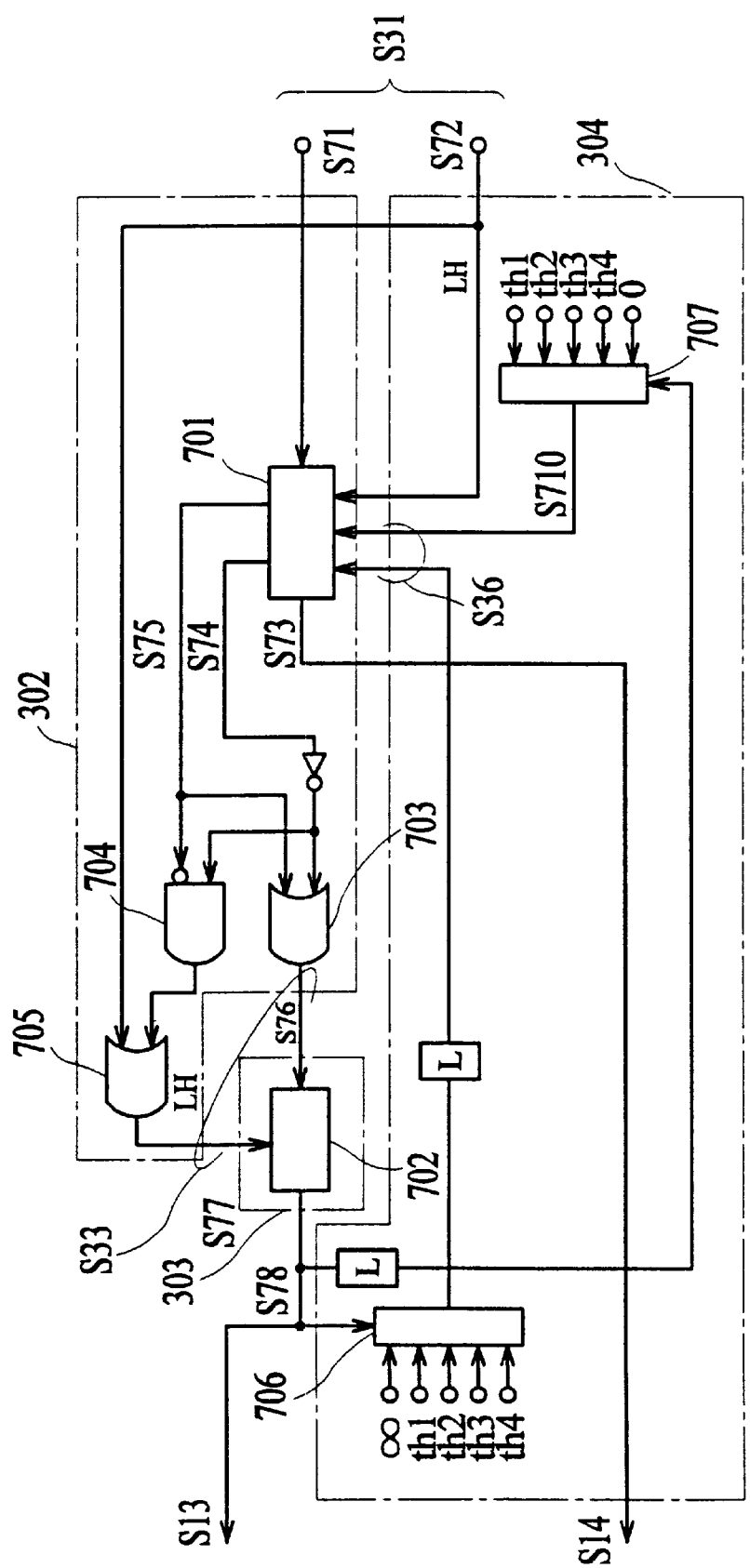
FIG. 7 is a block diagram of the exposure control means 305 for low brightness, in the first and second exemplary embodiments of the present invention.
Figure 8:
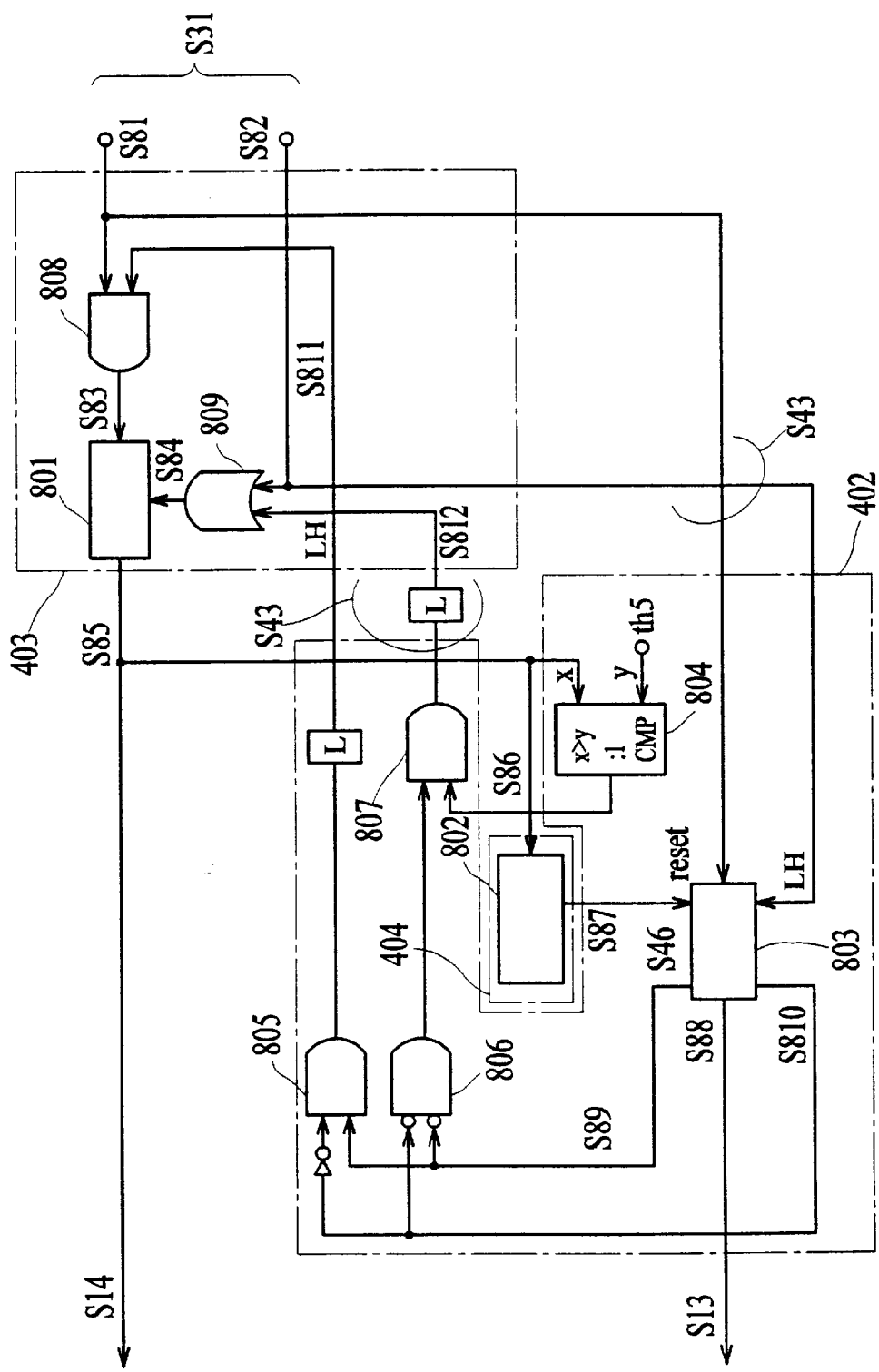
FIG. 8 is a block diagram of the exposure control means 405 for high brightness, in the first and second exemplary embodiments of the present invention.

FIG. 7 and FIG. 8 are block diagrams showing the exposure control means 305 and 405 of FIG. 3 and FIG. 4, respectively, which perform the above described operation. Description of which will follow.

FIG. 7 is a block diagram of a circuit which outputs the gain control signal S13 and the exposure time control signal S14 at low brightness. Where, numeral 701 denotes an up/down counter for counting the electric charge discharging period, 702 is an up/down counter for counting the gain value, 703, 704 and 705 are logic circuits for controlling data to be inputted to up/down counter 702, 706 is a selector for setting the upper limit value of up/down counter 701, and 707 is a selector for setting a count value when a borrow has arisen with up/down counter 701. "L" in FIG. 7 represents a latch for holding the signal value at each clock.

The operation of each part is described in the following. The up/down counter 701 of exposure time control means 302 receives exposure control signal S31 from exposure judgment means. The exposure control signal S31 is comprised of exposure control signals S71 and S72. The exposure control signal S71 is a signal which controls the increase/decrease of gain and exposure time, while the exposure control signal S72 is a signal which controls up/down counter 701 to hold the exposure time and gain. Up/down counter 701 increments the count value if the exposure control signal S71 is 1, and decrements if it is 0. However, if the exposure control signal S72 is 1, the count value is held irrespective of the exposure control signal S71. At the increment, if the count value exceeded the upper limit value S79, the count value is turned to be 0 and a carry S74 is generated, and in a case when a borrow S75 arisen at the decrement the count value is turned to a value set by selector 707. Count value is output as the drive pulse control signal S73, which makes itself an exposure time control signal S14. Logic circuits 703, 704 and 705 gate the signals S72, S74 and S75, and deliver a count control signal S76 for up/down counter 702 and a signal S77 for holding the count value.

The up/down counter 702 increments the count value if signal S76 is 1, and decrements if it is 0. However, in a case when signal S77 is 1, the count value is held irrespective of the signal S76. The count value is delivered as the gain control signal S78 to amplifying means 103 and selectors 706 and 707. The gain control signal S78 is the gain control signal S13. Selector 706 selects the upper limit value of up/down counter 701 according to gain control signal S78. The value corresponds to th1, th2, th3, th4 of FIG. 5; th0 is selected if gain control signal S78 is 0, th1 if it is 1, th2 if it is 2, th3 if it is 3, th4 if it is 4. Selector 707 selects in accordance with gain control signal S78 a count value of up/down counter 701 when a borrow has arisen. The value corresponds to th1, th2, th3, th4 of FIG. 5; th1 is selected if gain control signal S78 is 0, th2 if it is 1, th3 if it is 2, th4 if it is 3, and 0 if it is 4. With the above described constitution, the gain control signal S13 and the exposure time control signal S14 are outputted with the operating characteristics as shown in FIG. 5.

FIG. 8 is a block diagram showing a circuit which outputs the gain control signal S13 and the exposure time control signal S14 at high brightness. Where, numeral 801 denotes an up/down counter for counting the electric charge discharging period, 804 a comparator, 802 an upper limit value setting means for setting an upper limit value of up/down counter 803 based on output of up/down counter 801, 803 an up/down counter for counting the gain value, and 805, 806, 807, 808, 809 logic circuits for controlling count value of up/down counter 801. The operation of each will be described in the following.

The exposure time control means 403 receives exposure control signal S31. The exposure control signal S31 is comprised of exposure control signals S81 and S82. The exposure control signal S81 is a signal which controls the increase/decrease of gain and exposure time, while the exposure control signal S82 is a signal which controls up/down counter 801 to hold the exposure time and gain. The up/down counter 801 increments the count value if the signal S83 gated by logic circuit 808 is 1, decrements if it is 0. However, if the signal S84 is 1, the count value is held irrespective of the signal S83. The count value is outputted as the drive pulse control signal S85, which is equal to the exposure time control signal S14. Comparator 804 compares the drive pulse control signal S85 and the ti5 of FIG. 6, and outputs 1 if th5<S85. Upper limit value setting means 802 selects the upper limit value of up/down counter 803 according to drive pulse control signal S85. The value corresponds to G0, G1, G2, G3, of FIG. 6; G3 is selected if th5 >=S84, G2 if th5<S84 is 0, G1 if th6<S84, G0 if th7 <S84.

The up/down counter 803 increments the count value if the exposure control signal S81 which controls the increase/ decrease of gain and exposure time is 1, and decrements if it is 0. However, if the exposure control signal S82 is 1, the count value is held irrespective of the exposure control signal S81. At the increment, if the count value exceeded the upper limit value S87, the count value is turned to be 0 and a carry S89 is generated, and in a case when a borrow S810 has arisen at the decrement the count value is turned to the upper limit value S87. The count value is output as the gain control signal S88, which is equal to the gain control signal S13. Signals S89 and S810 are gated by logic circuits 805, 806, 807, and feed back to up/down counter 801 as the control signals S811, S812. The control signal 811 becomes 1 if carry S89 is 1 and borrow S810 is 0; the control signal 812 becomes 1 if carry S89 is 0, borrow S810 is 0 and output of comparator 804 is 1 (th5 <S84), and makes itself a control signal for holding the count value of up/down counter 801.

With the above described constitution, the gain control signal S13 and the exposure time control signal S14 are output with the operating characteristics as shown in FIG. 6.

Figure 9:
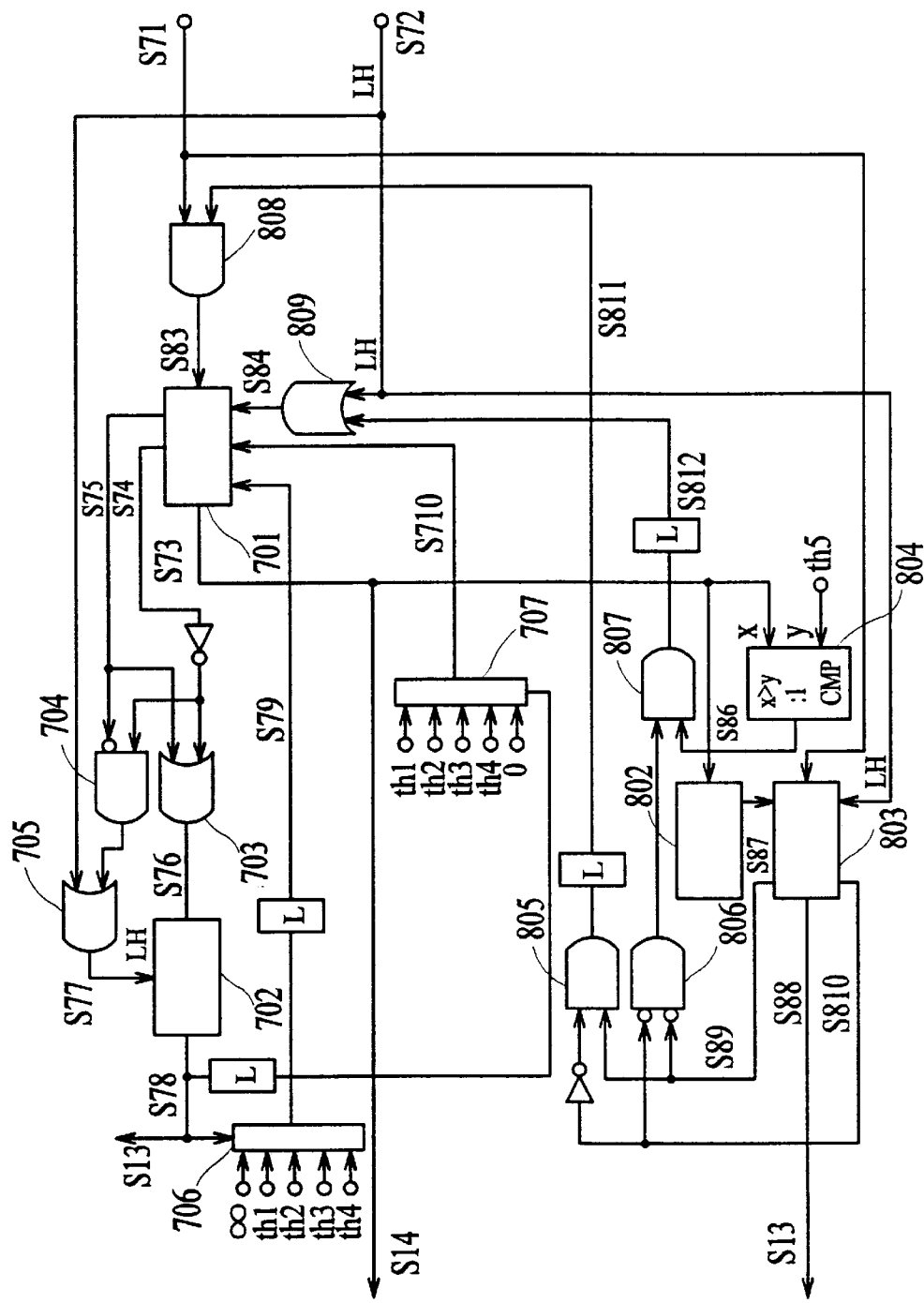
FIG. 9 is a block diagram of the exposure control means for any brightness, in the first and second exemplary embodiments of the present invention.

FIG. 9 is a block diagram, composed of the block diagrams of FIG. 7 and FIG. 8, of a means for controlling the exposure time and the gain, that complies with any brightness of an object. Each of the blocks operate in the same way as described in FIG. 7 and FIG. 8, therefore these descriptions are omitted here. The signal S73 in block diagram FIG. 9 is delivered as is to drive pulse generating means 105 as the exposure time control signal S14. Both of the gain control signals S78 and S88 are for controlling the gain; as either one of which bears the value G3 (1 time), the sum of both signals minus G3 may be outputted as the gain control signal S13.

Figure 10:
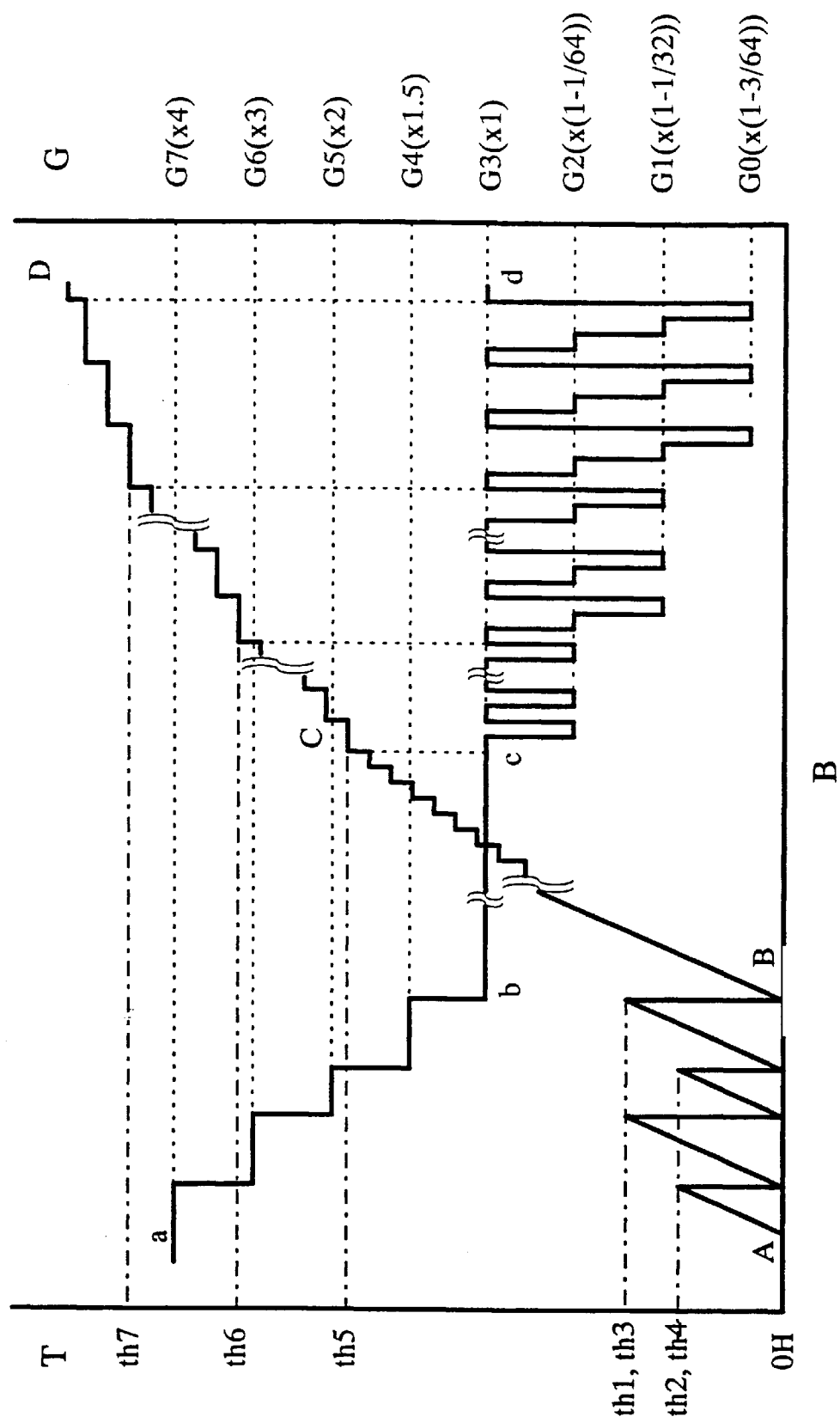
FIG. 10 is an operating characteristics chart showing the control signal of the amplifying means and the drive pulse generating means at any brightness, in the first and second exemplary embodiments of the present invention.

FIG. 10 is an operating characteristics chart of gain control signal S13 and exposure time control signal S14 output from FIG. 9 block diagram; where, the locus a, b, c, d represents the gain control signal S13, and the locus A, B, C, D represents the exposure time control signal S14.

As described in the foregoing, according to the present invention, the exposure time and the gain are adjusted smoothly without necessitating a mechanical iris diaphragm, by suppressing the change rate of output from the amplifying means, in whatever state the brightness change of an object may be, below a certain specific value through an adjustment by exposure adjustment means of only the gain at amplifying means and the exposure time of solid state image sensing device. Thus, a compact and vibration-resistive exposure control system results.

In the foregoing, although the gain values were discrete, these gains may be continuous. In the latter case, the exposure time memory device 304 in FIG. 3 block diagram is eliminated.

Figure 11A:
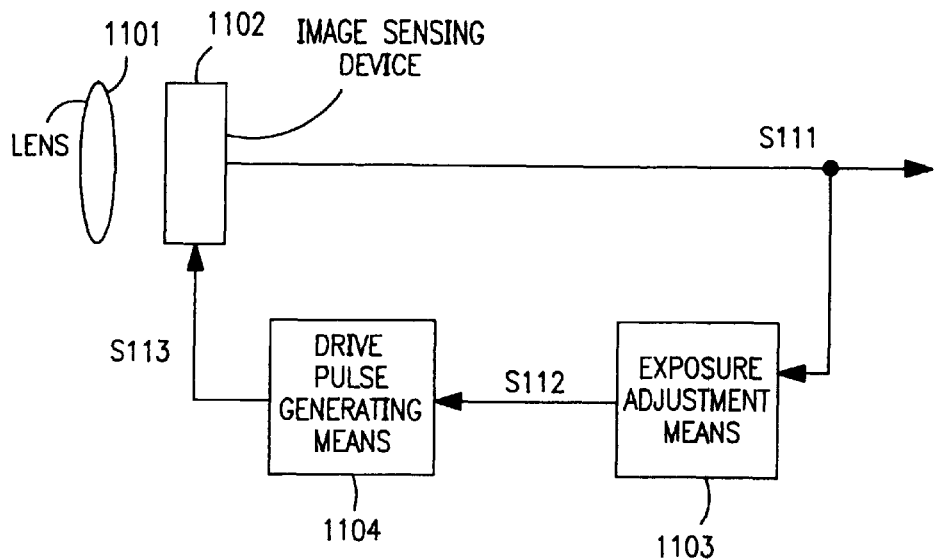
FIG. 11A is a block diagram showing an exposure control system in a third exemplary embodiment of the present invention.

FIG. 11A is a block diagram showing an exposure control system according to a third exemplary embodiment of the present invention. In FIG. 11A, numeral 1101 denotes a lens for focusing the image of an object, 1102 a solid state image sensing device for doing photoelectric conversion on an object image focused through said lens 1101, 1103 an exposure adjustment means for adjusting the exposure time of solid state image sensing device 1102 based on output of solid state image sensing device 1102, and 1104 a drive pulse generating means for generating a drive pulse for solid state image sensing device 1102.

The operation of an exposure control system according to the present embodiment having the above described constitution is described in the following. Solid state image sensing device 1102 converts an object image focused through lens 1101 into electric signal S111. Exposure adjustment means 1103 determines, based on the signal level of S111, whether the present exposure time is to be decreased, increased or maintained. When it is to be decreased, the drive pulse generating means 1104 is controlled to make the exposure time of solid state image sensing device 1102 shorter. When the exposure time is short, the exposure time is adjusted by delivering the gain value of exposure adjustment means 1103 suppressed to be below 1. When it is to be increased, the drive pulse generating means 1104 is controlled to make the exposure time of solid state image sensing device 1102 longer. When the exposure time is to be held as it is, the drive pulse generating means 1104 is controlled to hold the drive pulse of that state. The constitution and the operation of a third exemplary embodiment is as described above.

Figure 11B:
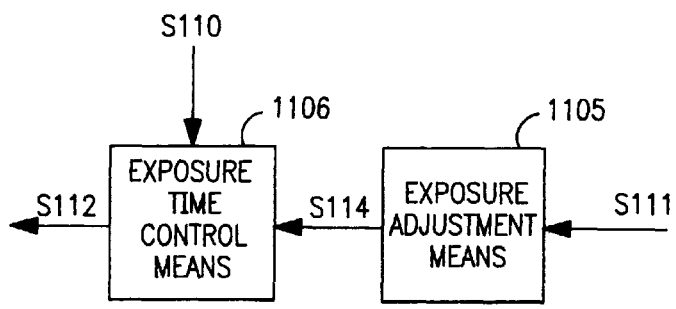
FIG. 11B is a block diagram showing the exposure adjustment means 1103 of the third exemplary embodiment of the present invention.

FIG. 11B shows the constitution of exposure adjustment means 1103. In FIG. 11B, numeral 1105 indicates an exposure judgment means which judges, referring to the existing state of exposure (signal S111) whether the exposure time is to be decreased, increased or maintained, and outputs a control signal S114; and 1106 is an exposure time control means for controlling the exposure time of solid state image sensing device 1102.

The operation of each is described in the following. The exposure judgment means 1105 performing the same operation as the already described exposure judgment means 301. The exposure time control means 1106 makes the exposure time S113 longer if the judgment result S114 of exposure judgment means 1105 indicates to lengthen the exposure time, makes the exposure time S113 shorter if the judgment result S114 indicates to shorten the exposure time, and maintains the exposure time S113 if the judgment result S114 indicates to hold the exposure time. In this state, when the last pulse of the discharging pulse, which determines the exposure time, is located within the vertical blanking period (S110 denotes vertical blanking), the exposure time control means 1106 is capable of controlling the exposure time continuously by outputting the discharging pulse at any desired tiig including the scanning period. The location of the last pulse is not necessarily be within the horizontal blanking period.

Figure 12:
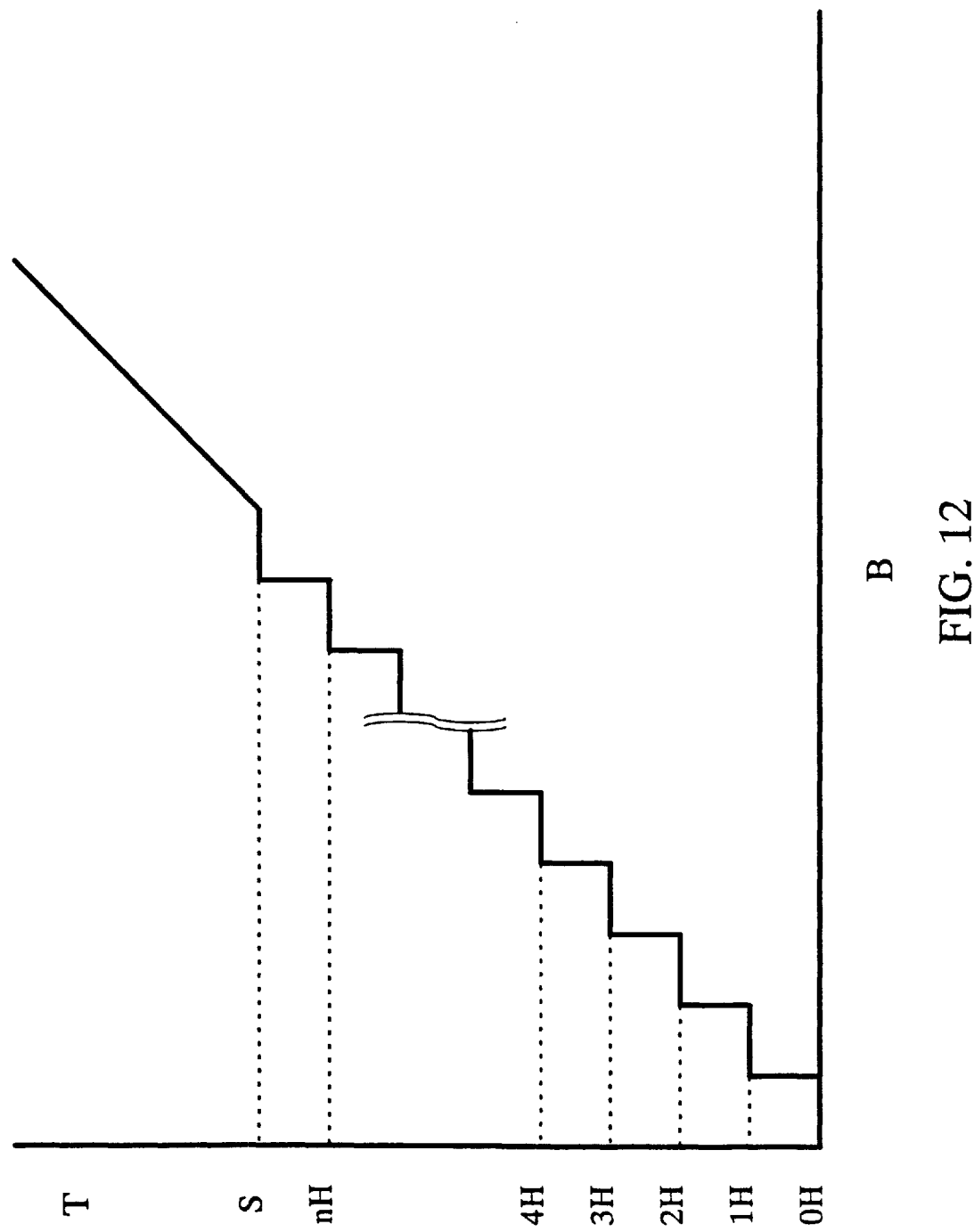
FIG. 12 is an operating characteristics chart showing the control signal of the drive pulse generating means, in the third exemplary embodiment of the present invention.

FIG. 12 is an operating characteristics chart showing the exposure time S112 delivered from exposure time control means 1106. The chart will be described in the following. When the object brightness B is low the electric charge discharging period is short, as a result the last pulse of the discharging pulse does not fall within the vertical blanking period, but the electric charge discharging period takes discrete values. When the object gets brighter, the location of last pulse of the discharging pulse gradually gets closer to the vertical blanking period to make the electric charge discharging period longer. At about the time when it enters into the vertical blanking period, the variation of discharging pulse at each one horizontal scanning period renders the change rate of the output of the solid state image sensing device 1102 so large that the location of the last pulse of the discharging pulse is allowed to any timing within the scanning period, not limited within the horizontal blanking period, by so doing the electric charge discharging period is varied continuously. Namely, as no read out from the transfer channel is taking place during the vertical blanking period, the read out signal may not be affected by noise.

As described in the above, according to the present exemplary embodiment, a smooth exposure control at high brightness is conducted without the help of a mechanical iris diaphragm, through a control means in which the exposure time control means 1106 controls drive pulse generating means 1104 based on a result of judgment by exposure judgment means 1105, especially, when an object brightness enters into a high range and the discharging pulse generated by drive pulse generating means 1104 to be delivered to solid state image sensing device 1102 is coming into the inside of vertical blanking period, the change rate of output from said solid state image sensing device 1102 is suppressed below a certain specific value whatever said object brightness may change, by conducting a control so that the exposure time takes continuous values.

As described in the foregoing, according to the present invention, a compact, inexpensive and vibration-resistive exposure control system is implementable with which system the exposure time and the gain are controlled smoothly without the help of a mechanical iris diaphragm.

The invention may be embodied in other specific forms without departing from the spirit or essential characteristics thereof. The present exemplary embodiment is therefore to be considered in all respects as illustrative and not restrictive. For example, the change rate of the gain is not restricted to what was exemplified, it may be modified freely according to one's design choice, further, it may take continuous values instead of discrete values. The scope of the invention is indicated by the appended claims rather than by the foregoing description and all changes which come within the meaning and range of equivalency of the claims are therefore intended to be embraced therein.

What is claimed:

1. An exposure control system comprising:
   a lens for receiving an image of an object,
   a solid state image sensing device for performing a photoelectric conversion of the image of the object received through said lens,
   amplifying means for applying a gain to an output of said solid state image sensing device,
   exposure adjustment means for controlling a rate of change of said amplifying means responsive to a change in the brightness of said object and for adjusting an exposure time of said solid state image sensing device and the gain of said amplifying means, based on one of the output of said solid state image sensing device and the output of said amplifying means, and
   drive pulse generating means for generating a drive pulse which determines the exposure time of said solid state image sensing device
   wherein the exposure adjustment means comprises
      an exposure judgment means for determining whether to modify either one of the exposure time and the gain,
      exposure time control means for controlling the exposure time of said solid state image sensing device based on said drive pulse,
      control means for controlling the gain of said amplifying means, and
      an exposure time memory device for memorizing a minimum exposure time of said solid state image sensing device;
      wherein said exposure judgment means determines whether the exposure time of said solid state image sensing device is modified, and supplies the result to said exposure time control means;
      said exposure time control means determines the exposure time based on the result of judgment by said exposure judgment means;
      said exposure time memory device supplies the minimum exposure time, corresponding to the value of the gain output by said gain control means, to the exposure time control means;
      when the exposure time coincides with the shortest exposure time and the exposure judgment means determines to further shorten the exposure time, the exposure time control means increases the exposure time to a maximum value and the gain control means decreases the gain; and
      when the exposure time coincides with the maximum exposure time and the exposure judgment means determines to further increase the exposure time, the exposure time control means decreases the exposure time to the minimum exposure time and the gain control means increases the gain.

2. An exposure control system comprising:
   a lens for receiving an image of an object,
   a solid state image sensing device for performing a photoelectric conversion of the image of the object received through said lens,
   amplifying means for applying a gain to an output of said solid state image sensing device,
   exposure adjustment means for controlling a rate of change of said amplifying means responsive to a change in the brightness of said object and for adjusting an exposure time of said solid state image sensing device and the gain of said amplifying means, based on one of the output of said solid state image sensing device and the output of said amplifying means,
   exposure judgment means for determining whether to modify one of the exposure time and the gain,
   drive pulse generating means for generating a drive pulse,
   exposure time control means for controlling the exposure time of said solid state image sensing device based on said drive pulse,
   gain control means for controlling the gain of said amplifying means, and
   as gain memory device for memorizing a minimum gain value of said amplifying means; wherein said exposure judgment means determines whether the gain of said amplifying means is one of increased, decreased or maintained, and supplies the result to said gain control means;
   said gain control means determines the gain based on the result of judgment by said exposure judgment means;
   said gain memory device supplies a minimum gain value of the gain to the gain control means, based on the exposure time output from said exposure time control means;
   when the gain coincides with the minimum gain value and the exposure judgment means determines to further reduce the gain, the gain control means increases the gain to a maximum value and the exposure time control means decreases the exposure time; and
   when the gain coincides with the maximum gain value and the exposure judgment means determines to further increase the gain, the gain control means decreases the gain the minimum value and the exposure time control means increases the exposure time device.

3. An exposure control system comprising:
   a lens for receiving an image of an object, a solid state image sensing device for performing a photoelectric conversion of the image of the object received through said lens,
   means for applying a gain to an output of said solid state image sensing device,
   exposure adjustment means for adjusting an exposure time of said solid state image sensing device and the gain of said amplifying means, based on one of the output of said solid state image sensing device and the output of said amplifying means, and
   drive pulse generating means for generating a drive pulse which determines the exposure time of said solid state image sensing device,
   wherein said exposure adjustment means controls a rate of change of said amplifying means responsive to a change in the brightness of said object and wherein the exposure adjustment means further comprises:
      an exposure judgment means for determining whether to modify either one of the exposure time and the gain,
      exposure time control means for controlling the exposure time of said solid state image sensing device,
      gain control means for controlling the gain of said amplifying means, and an exposure time memory device for memorizing a minimum exposure time of said solid state image sensing device;

wherein said exposure judgment means determines whether the exposure time of said solid state image sensing device is modified, and supplies the result to said exposure time control means;

said exposure time control means determines the exposure time based on the result of judgment by said exposure judgment means;

said exposure time memory device supplies the minimum exposure time, corresponding to the value of the gain output by said gain control means, to the exposure time control means;

a gain memory device for memorizing a minimum gain value of said amplifying means; wherein said exposure judgment means determines whether the gain of said amplifying means is one of increased, decreased or maintained, and supplies the result to said gain control means;

said gain control means determines the gain based on the result of judgment by said exposure judgment means;

said gain memory device supplies a minimum gain value of the gain to the gain control means, based on the exposure time output from said exposure time control means;

when the gain coincides with the minimum gain value and the exposure judgment means determines to further reduce the gain, the gain control means increases the gain to a maximum value and the exposure time control means decreases the exposure time a step; and when the gain coincides with the maximum gain value and the exposure judgment means determines to further increase the gain, the gain control means decreases the gain the minimum value and the exposure time control means increases the exposure time a step;

When the exposure time coincides with the shortest exposure time and the exposure judgment means determines to further shorten the exposure time, the exposure time control means increases the exposure time to a maximum value and the gain control means decreases the gain a step; and when the exposure time coincides with the maximum exposure time and the exposure judgment means determines to further increase the exposure time, the exposure time control means decreases the exposure time to the minimum exposure time and the gain control means increases the gain a step.

4. An exposure control system comprising: a lens for receiving an image of an object, a solid state image sensing device for performing a photoelectric conversion of the image of the object received through said lens, amplifying means for applying a gain to an output of said solid state image sensing device, exposure adjustment means for adjusting an exposure of time of said solid state image sensing device and the gain of said amplifying means, based on one of the output of said solid state image sensing device and the output of said amplifying means, and drive pulse generating means for generating a drive pulse which determines the exposure time of said solid state image sensing device, wherein said exposure adjustment means controls the gain of said amplifying means step by step upon the object brightness of said object image changes, and when the gain of said amplifying means cannot reach to a certain range, though adjusting the gain by certain steps based on an object brightness, said exposure adjustment means adjusts exposure time by one step, at the same time brings the gain of said amplifying means back to the original level, and the above operation to be repeated until the output of said amplifying means falls in a certain range.

* * * * *

UNITED STATES PATENT AND TRADE MARK OFFICE
CERTIFICATE OF CORRECTION

PATENT NO.    : 5,986,705
DATED         : November 16, 1999
INVENTOR(S)   : Shibuya et al.

It is certified that error appears in the above-identified patent and that said Letters Patent is hereby corrected as shown below:

Column 15, line 35, before "control" insert --gain--.

Column 16, line 19, "as" should be --a--.

Column 16, line 46, before "means" insert --amplifying--.

Column 18, line 1, "When" should be --when--.

Signed and Sealed this

Twenty-seventh Day of March, 2001

Attest:

NICHOLAS P. GODICI

Attesting Officer

Acting Director of the United States Patent and Trademark Office